United States Patent
Chou et al.

(10) Patent No.: US 9,465,393 B2
(45) Date of Patent: Oct. 11, 2016

(54) POWER MANAGEMENT CIRCUIT AND METHOD THEREOF

(71) Applicant: WISTRON CORP., New Taipei (TW)

(72) Inventors: Ying-Tzu Chou, New Taipei (TW); Chun-Ta Lee, New Taipei (TW); Chih Chain Kung, New Taipei (TW); Chia Zen Sheu, New Taipei (TW); Tsang Ping Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 776 days.

(21) Appl. No.: 13/844,896

(22) Filed: Mar. 16, 2013

(65) Prior Publication Data

US 2014/0111030 A1    Apr. 24, 2014

(30) Foreign Application Priority Data

Oct. 19, 2012 (TW) .............................. 101138661 A

(51) Int. Cl.
| | |
|---|---|
| *H02J 7/00* | (2006.01) |
| *G05F 1/10* | (2006.01) |
| *G06F 1/30* | (2006.01) |

(52) U.S. Cl.
CPC .................. *G05F 1/10* (2013.01); *G06F 1/305* (2013.01); *Y10T 307/858* (2015.04)

(58) Field of Classification Search
CPC ........................................................ H02J 7/00
USPC .......................................... 307/130; 320/107
See application file for complete search history.

(56) References Cited

U.S. PATENT DOCUMENTS

| | | | | |
|---|---|---|---|---|
| 7,197,650 | B2* | 3/2007 | Watanabe .............. | G06F 9/4415 307/126 |
| 2009/0267570 | A1* | 10/2009 | Paunonen ................. | G06F 1/24 320/150 |
| 2010/0090644 | A1* | 4/2010 | Nokkonen ................ | G06F 1/26 320/107 |
| 2012/0249084 | A1* | 10/2012 | Vilhauer ............... | H02J 7/0029 320/162 |
| 2012/0293136 | A1* | 11/2012 | Chen ........................ | G06F 1/266 320/162 |
| 2012/0306455 | A1* | 12/2012 | Fischbach ............. | H02J 7/0052 320/162 |
| 2013/0002192 | A1* | 1/2013 | Fischbach ................. | H02J 7/00 320/107 |
| 2013/0069600 | A1* | 3/2013 | Knowlton ............... | H02J 7/008 320/162 |
| 2013/0127402 | A1* | 5/2013 | Pulijala ................. | H02J 7/0009 320/107 |
| 2013/0162198 | A1* | 6/2013 | Yokota .................... | H02J 7/007 320/107 |

* cited by examiner

*Primary Examiner* — Rexford Barnie
*Assistant Examiner* — Joseph Inge
(74) *Attorney, Agent, or Firm* — Li & Cai Intellectual Property (USA) Office

(57) ABSTRACT

A power management circuit adapted for a portable electronic device is provided. The portable electronic device receives a supply voltage from a USB power supplying port through a built-in USB charging port. The power management circuit includes a USB detection unit, a voltage detection unit, and a control unit. The USB detection unit determines the type of the USB power supplying port. The voltage detection unit detects the supply voltage. The control unit configures the power consumption of the portable electronic device based on the type of the USB power supplying port and the supply voltage. When the portable electronic device initiates booting process with the USB power supplying port being the Dedication Charging Port and the supply voltage being lowered than a threshold, the control unit reduces the power consumption of the portable electronic device to maintain the supply voltage above the threshold for booting stably.

5 Claims, 9 Drawing Sheets

POWER MANAGEMENT CIRCUIT AND METHOD THEREOF

BACKGROUND

1. Technical Field

The present disclosure relates to a power management circuit and a method thereof, in particular, to a power management circuit and a method thereof for a portable electronic device having at least a USB charging port.

2. Description of Related Art

As technology advanced, portable electronic electronics such as smart phone, tablet, laptop, digital camera, video camcorder and MP3 player have been widely used in our daily life. Portable electronic devices are often equipped with rechargeable batteries supplying the required power for the carrying convenience of users. Currently as more and more power consumed functionalities including Bluetooth, WiFi and 3 G communication have been incorporated in the portable electronic devices thereby increasing the overall processing loads and the operational power consumption of the rechargeable battery thereof. Accordingly, fast charging has become a desirable objective to achieve for users of the portable electronic devices.

Currently, industries promote the use of the universal serial bus (USB) as an interface for powering the portable electronic device or for charging the rechargeable battery thereof. So that using the USB to charge the rechargeable battery of the portable electronic device has gradually become the industrial charging standard. It is known that the supply voltage of the conventional USB is 5V with maximum supply current of 500 mA. Recently, in responsive to the demands of fast charging, the USB Implementers' Forum (USB-IF) has defined new USB charging standard, i.e., the USB battery charging specification revision 1.1 (BC1.1).

Under the USB-IF BC1.1, the Available Current Allowance for each type of USB adapter have been specified. Specifically, the USB ports have been classified into three types including the Standard Downstream Port (SDP), the Charging Downstream Port (CDP), and the Dedicated Charging Port (DCP) for various electric products. Each type of USB port can support different charging current required and complex USB charger protocols. The SDP port is the current standard USB port which can only supply 500 mA maximum to charge the rechargeable battery. Whereas both the CDP port and DCP port can further increase the supply current up to 1500 mA or even to 2000 mA to accommodate type and capacity of the rechargeable battery and power consumption required for various portable electronic devices thereby reduce the charging period.

Since the USB port are classified into the SDP port, the DCP port, and the CDP port according to the newly defined USB charging specification. A USB charging port adopted has to match the charging standard in corresponding to the power consumption requirement and rechargeable battery capacity of the portable electronic device. However, the current existing portable electronic device may not have the mechanism for identifying the USB port or for operating in responsive to different type of the USB ports. Accordingly, when a user uses the wrong type of the charging port to supply the operation power or to charge the rechargeable battery, not only the charging efficiency may be lowered, but also could cause the instability of the system. In particular, when the portable electronic device has booting the system using the power received from improper USB port, the system could face overloading issue resulting from insufficient supply power and constantly switching on and off eventually leading to malfunction of the system. For instance, when the portable electronic device requires 7.5 W to turn on but was connected to a SDP port which can only supply 2.5 W to the portable electronic device. Consequently, the portable electronic device may thus experience instantly turning on and off due to insufficient power and eventually lead to the malfunction of the portable electronic device.

SUMMARY

Accordingly, an exemplary embodiment of the present disclosure provides a power management circuit and method thereof. The power management circuit and method thereof can actively determine whether the portable electronic device can initiate the booting process and configure the initial system power consumption according to the type of the USB power supplying port and the supply power thereof. Consequently, the issues of instantly turning on and off causing instability of the portable electronic device due to the connected USB power supplying port not being compatible to the system power consumption required or the insufficient power provided by the built-in rechargeable battery may be avoided. The convenience and stability of the portable electronic device can therefore increase.

An exemplary embodiment of the present disclosure provides a power management circuit which can be adapted for a portable electronic device. The portable electronic device has a universal serial bus (USB) charging port and is electrically connected to a USB power supplying port through the USB charging port to receive a supply voltage. The power management circuit includes a USB detection unit, a voltage detection unit, and a control unit. The USB detection unit is coupled to the USB charging port and determines the type of the USB power supplying port connected to the USB charging port being a Standard Downstream Port (SDP) or a Dedicated Charging Port (DCP). The voltage detection unit is coupled to the USB charging port for detecting the supply voltage. The control unit is coupled to the USB detection unit and the voltage detection unit. The control unit configures a system power consumption of the portable electronic device based on the type of the USB power supplying port and the supply voltage. When the portable electronic device initiates the booting process with the USB power supplying port being the DCP and the supply voltage being lowered than a threshold, the control unit reduces the system power consumption of the portable electronic device to maintain the supply voltage above the threshold for the portable electronic device to boot normally.

An exemplary embodiment of the present disclosure provides a power management method adapted for a portable electronic device having a USB charging port. The portable electronic device further is electrically connected to a USB power supplying port through the USB charging port to receive a supply voltage. The power management method includes the following steps. Firstly, whether the USB power supplying port being a SDP port or a DCP port is determined. Subsequently, the supply voltage is detected. Then, a system power consumption of the portable electronic device is configured based on the type of the USB power supplying port and the supply voltage. When the portable electronic device initiates the booting process with the USB power supplying port being the DCP port and the supply voltage being lowered than a threshold, reduces the system power consumption of the portable electronic device to maintain the supply voltage above the threshold for the portable electronic device to boot normally.

To sum up, an exemplary embodiment of the present disclosure provides a power management circuit and method thereof. The power management circuit and method thereof can actively determine whether the portable electronic device is capable of initiating the booting process and configuring the initial system power consumption through detecting the type of the USB power supplying port and the supply power thereof at system prior to the initiation of the booting process. Consequently, the issues of instantly turning on and off effecting the stability of the portable electronic device owing to the connected USB power supplying port not being able to support the system power consumption required or the power provided by the built-in rechargeable battery being insufficient can be effectively avoided. Accordingly, the convenience and stability of the portable electronic device can be increased.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 6-1 and FIG. 6-2 respectively illustrate a power management method provided in accordance to a fourth exemplary embodiment of the present disclosure.

FIG. 7-1 and FIG. 7-2 respectively illustrate a method of supply power determination and operating mode switching operation provided in accordance to the fourth exemplary embodiment of the present disclosure.

DESCRIPTION OF THE EXEMPLARY EMBODIMENTS

Figure 1:
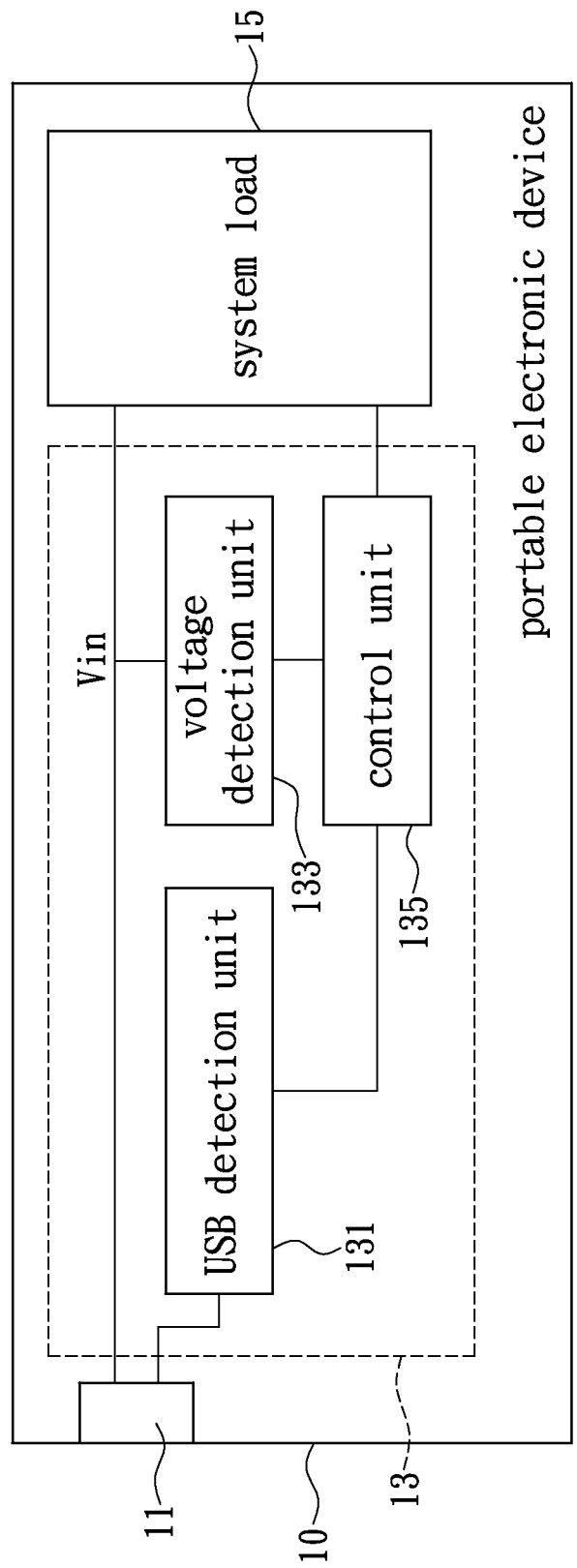
FIG. 1 is a block diagram illustrating a portable electronic device provided in accordance to a first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

First Exemplary Embodiment

Please refer to FIG. 1 which shows a block diagram illustrating a portable electronic device provided in accordance to the first exemplary embodiment of the present disclosure. The portable electronic device 10 may be a portable electronic device having a universal serial bus (USB) port including but not limited to a smart phone, a tablet, a personal digital assistance (PDA), a laptop, a digital camera, and an MP3 player.

The portable electronic device 10 includes a USB charging port 11, a power management circuit 13, and a system load 15. Simply speaking, the portable electronic device 10 can electrically connect to an external USB power supplying port (not shown) through the built-in USB charging port 11 to receive a supply voltage Vin. The power management circuit 13 can actively determines a supply power of the USB power supplying port and correspondingly configures the operation of the system load 15 according to the detected type of the USB power supplying port and the received supply voltage Vin.

The system load 15 in the instant embodiment may represent all the power consumed components (i.e., equivalent resistively loads) of the portable electronic device 10 including but not limited to a central processor (not shown), a system operation module (not shown), a display unit (not shown), and the peripheral devices. Incidentally, the actual structure and implementation of the system load 15 may vary according to the actual type and structure of the portable electronic device 10. Moreover, since the structure of the system load 15 is known to those skilled in the art and is not the main emphasis of the present disclosure, and further details regarding the system load 15 are hereby omitted. The USB charging port 11 may be realized by a USB interface or a micro-USB interface.

The power management circuit 13 further includes a USB detection unit 131, a voltage detection unit 133, and a control unit 135. The USB detection unit 131 and the voltage detection unit 133 are respectively coupled to the USB charging port 11. The control unit 135 is coupled to the USB detection unit 131 and the voltage detection unit 133. The control unit is further coupled to the system load 15.

Specifically, the USB detection unit 131 is used for determining whether the type of the USB power supplying port being connected to the USB charging port 11 is a Standard Downstream Port (SDP) or a Dedicated Charging Port (DCP) and outputting the determination result to the control unit 135. For example, when the USB detection unit 131 determines that the USB power supplying port being a SDP port, outputs a high voltage level signal to the control unit 135. Conversely, when the USB detection unit 131 determines that the USB power supplying port being a DCP port, outputs a low voltage level signal to the control unit 135.

It is worth mentioned that the SDP port in the instant embodiment can supply 5V voltage with maximum supply current of 500 mA. The DCP port can be the general dedicator charging adapter and can supply 5V or 12V voltage with maximum supply current of 1000 mA, 1500 mA, or 2000 mA according to the standards of the DCP port.

The USB detection unit 131 may determine the type of the USB power supplying port according to the data line connection thereof. To put it concretely, it is well known in the art that a USB port in general has four pins including power pin VBUS, data pins D+/D−, and a ground pin GND. The difference between a SDP port and a DCP port is in that the data pins D+/D− of the DCP port are shorted through a series connected resistor. Whereas the data pins D+/D− of the SDP port are differential pair transmission line and the data pins D+/D− are not shorted. The USB detection unit 131 therefore can through detect the voltage variations at pins D+/D− of the USB power supplying port to determine the type thereof.

For instance, the USB detection unit 131 may output a voltage to data pin D+ and detect the voltage at the data pin D−. When the voltage at pin D+ and pin D− are approximately the same, indicates that the USB power supplying port is the DCP port. On the other hand, if the voltage at pin D+ and pin D− forms an open circuit, indicates that the USB power supplying port is the SDP port.

Based on the above explanations, those skilled in that art should be able to infer the technique for determining the type of USB power supplying port and the implementation of the USB detection unit 131, and further descriptions are hereby omitted.

The voltage detection unit 133 is used for detecting the voltage level of the USB charging port 11 received supply voltage Vin which is supplied by the USB power supplying port. To put it concretely, when the USB power supplying port can provide sufficient power driving the system load 15 of the portable electronic device 10, the voltage level of the supply voltage Vin received by the USB charging port 11 can be maintained at a threshold e.g., 4.5V. Conversely, when the USB power supplying port supplies insufficient power driving the system load 15 of the portable electronic device 10, the voltage level of the supply voltage Vin received by the USB charging port 11 would begin to drop below the threshold as the supply power being consumed by the system load 15. The threshold may be preset according to the operation voltage of the system load 15 and/or the standard of the USB power supplying port, however the instant embodiment is not limited thereto.

In one implementation, the voltage detection unit 133 may be implemented by a comparator (not shown). In particular, a first input terminal (i.e. the positive input terminal) of the comparator can be coupled to a reference voltage (V_REF) which can be set to be 90% of the supply voltage normally outputted by the USB power supplying port e.g., 4.5V. A second input terminal (i.e. the negative input terminal) of the comparator can be coupled to the USB charging port 11 to receive the supply voltage Vin supplied by the USB power supplying port. An output terminal of the comparator can be coupled to the control unit 135 so that the comparator can output the detection results to the control unit 135 accordingly.

For instance, when the voltage detection unit 133 detects that the supply voltage Vin is higher than the reference voltage V_REF, the voltage detection unit 133 outputs high voltage level signal to the control unit 135. Conversely, when the voltage detection unit 133 detects that the supply voltage Vin is lower than the reference voltage V_REF, the voltage detection unit 133 outputs low voltage level signal to the control unit 135. The comparator in the example may be further implemented by an operational amplifier, however the present disclosure is not limited thereto. It shall be noted that the reference voltage V_REF of the provided corresponds to the threshold and may be realized using a voltage divider circuit.

The control unit 135 may actively configure a system power consumption of the portable electronic device 10 based on the type of the USB power supplying port detected and the supply voltage Vin detected. That is the control unit 135 may configure the power consumption of the system load. In particular, the control unit 135 can configure the brightness level of a display unit and the operation frequency of the central processor to have the portable electronic device 10 booted normally under a selected operating mode.

In the case of the portable electronic device 10 being instructed to initiate the booting process with the voltage level of a rechargeable battery lower than a predetermined value. If the USB power supplying port being determined by the USB detection unit 131 to be a DCP port while the supply voltage Vin has been drop below the threshold (e.g. 4.5V) due to the power consumed by the system load 15 being greater than the supply power of the USB power supplying port, the control unit 135 may through configure the power consumption of the system load 15 reducing the system power consumption to have the supply voltage maintained above the threshold for the portable electronic device 10 to normally boot. At the same time, the control unit 135 may further utilize the power supplied by the USB power supplying port to charge the built-in rechargeable battery (not shown in FIG. 1).

On the other hand, if the USB power supplying port being determined by the USB detection unit 131 is a SDP port while the voltage level of a rechargeable battery lower than the predetermined value, the control unit 135 can instantly stop the portable electronic device 10 from turning on and utilize the power supplied by the USB power supplying port charging the built-in rechargeable battery. Incidentally, the predetermined value may be defined according the type and electrical spec of the rechargeable battery, e.g., the lower supply voltage limit of the rechargeable battery, and the instant embodiment is not limited thereto.

Accordingly, the power management circuit 13 may actively detect the power supplying status of the USB power supplying port and correspondingly configure the system power consumption of the portable electronic device 10 to have the portable electronic device 10 initiating the booting process normally when the voltage level of the rechargeable battery is lower than the predetermined value. Consequently, the issues of the portable electronic device 10 instantly turning on and off causing damage to the system may be avoided thereby enhance the applicability and stability of the portable electronic device 10.

When the USB detection unit 131 determines the USB power supplying port being the DCP port, the control unit 135 further may determine the supply power thereof according to the voltage variation in the supply voltage Vin. Specifically, the USB detection unit 131 determines the maximum supply current of the USB power supplying port being 1000 mA, 1500 mA, or 2000 mA for the control unit 135 to correspondingly configure the system power consumption of the portable electronic device 10. For instance, the control unit 135 can proportionally adjust the central processor operational frequency and brightness level associated with the display unit (not shown) and the central processor (not shown) of the portable electronic device 10 to generate multiple power-saving modes. The control unit 135 can thus drive the portable electronic device 10 switching among the power-saving modes to reduce the system power consumption. The power-saving modes may correspond to the supply current (i.e. supply power) of the USB power supplying port such that the portable electronic device 10 can properly boot in the selected power-saving mode.

Details regarding the switching operation of the portable electronic device 10 among multiple power-saving modes are provided in the following paragraphs.

In the instant embodiment, the control unit 135 may switch the operating mode of the portable electronic device 10 among a normal operating mode, a first power-saving mode, and a second power-saving mode according to the power supplying condition and the power consumption of the system load 15. For instance, the normal operating mode may correspond a DCP port providing supply power of 10 W i.e., supplying with 5V and 2000 mA or a DCP port providing supply power of 18 W i.e., supplying with 12V and 1500 mA. The first power-saving mode may correspond to a DCP port providing supply power of 7.5 W i.e., supplying with 5V and 1500 mA. The second power-saving mode may correspond to a DCP port providing supply power of 5 W i.e., supplying with 5V and 1000 mA. It is worth to note that in practice the power-saving mode may be defined according the actual powering requirement and the present disclosure is not limited thereto.

In one power-saving mode implementation, the control unit 135 may respectively configure the central processor operating frequency to a first power-saving frequency and the brightness level to a first power-saving brightness level (e.g., reduce the display brightness by 10%) prior to the booting process under the first power-saving mode. Similarly, the control unit 135 may respectively configure the central processor operating frequency to a second power-saving frequency (e.g., reduce the central processor operating frequency by 20%) and the brightness level to a second power-saving brightness level (e.g., reduce the display brightness by 20%) prior to the booting process under the second power-saving mode.

Figure 2:
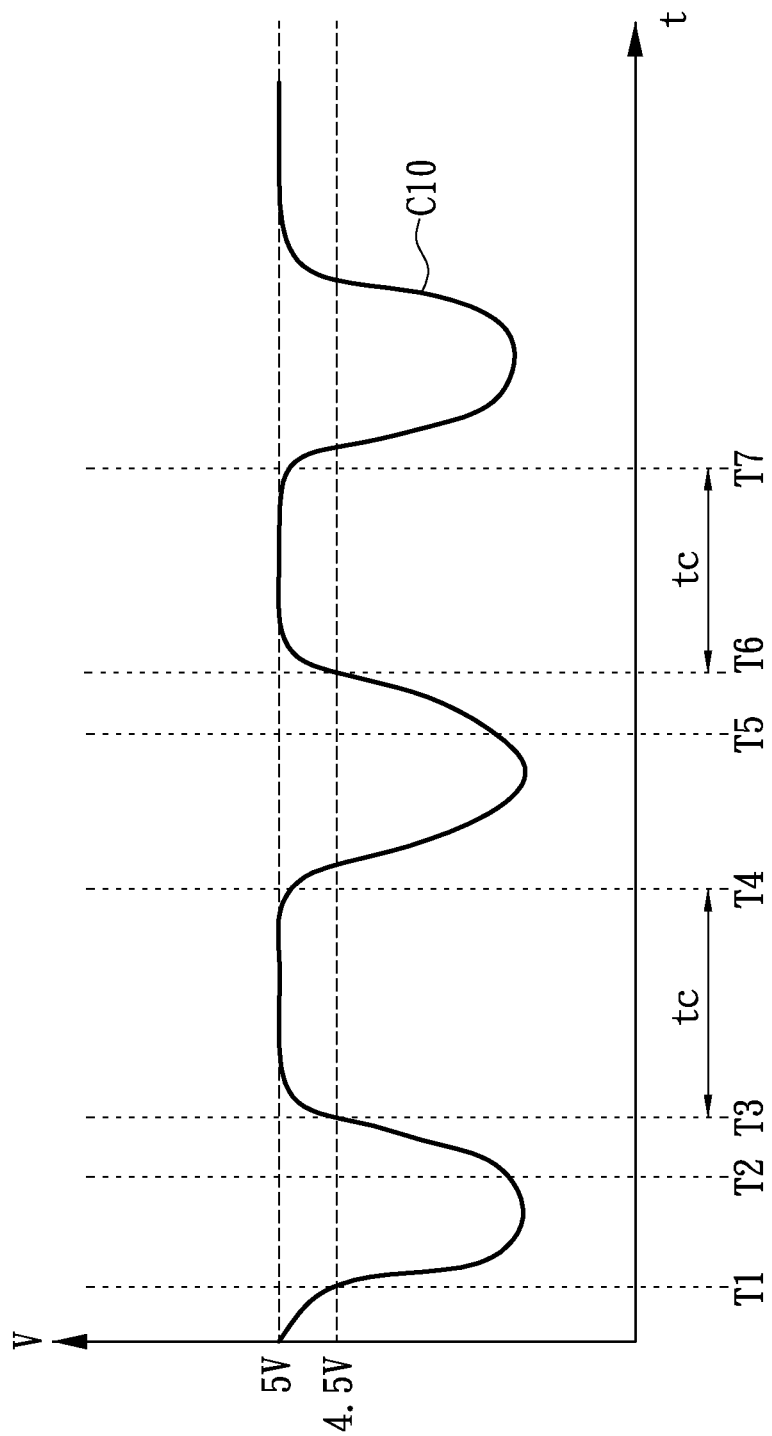
FIG. 2 is a waveform diagram illustrating the circuit operation of the portable electronic device provided in accordance to the first exemplary embodiment of the present disclosure.

Next, please refer to FIG. 2 which shows a waveform diagram illustrating the circuit operation of the portable electronic device 10 provided in accordance to the first exemplary embodiment of the present disclosure. Curve C10 represents the supply voltage received by the portable electronic device 10 over time.

As shown in FIG. 2, when the portable electronic device 10 has the voltage level of a rechargeable battery being lower than the predetermined value while the USB detection unit 131 of the portable electronic device 10 determines the USB power supplying port being the DCP port (i.e., curve C10 before time point T1), the control unit 135 would initially drive the portable electronic device 10 to operate in the normal operating mode. However, if the supply power provided by the USB power supplying port is insufficient to drive the system load 15, the supply voltage Vin begins to drop e.g., drops from 5V. When the voltage detection unit 133 detects that the supply voltage Vin is lower than the threshold e.g., 4.5V (i.e. at time point T1), the control unit 135 configures the power consumption of the system load 15 so as to switch the portable electronic device 10 into the first power-saving mode (i.e., at time point T2). At time point T3 as illustrated by curve C10, the supply voltage Vin increases to above the threshold (e.g., 4.5V) as the system power consumption of the portable electronic device 10 decreases.

When the supply voltage Vin has been maintained above the threshold for a predetermined time tc (e.g., 20 ms~60 ms), the control unit 135 can at time point T4 try to switch the portable electronic device 10 into the normal operating mode. Accordingly, whether the cause for voltage drop of the supply voltage at earlier time is because of the power instantly consumed at startup can be verified. However, if the supply voltage Vin starts to drop below threshold (e.g., 4.5 V) as illustrated by curve C10 between time point T4~T5 indicating that the supply power of the USB power supplying port can only support the portable electronic device 10 operating in first power-saving mode.

The control unit 135 then configures the power consumption of the system load 15 to have the portable electronic device 10 booting under the first power-saving mode. The control unit 135 further may determine that the maximum supply current supplied by the USB power supplying port is 1500 mA and the supply power thereof is 7.5 W. It is worth to note that the control unit 135 may repeatedly switch the portable electronic device 10 between the normal operating mode and the first power-saving mode for couple more times (e.g., time point T5~T7) to confirm the supply power of the USB power supplying port.

That is to say that the control unit 135 may repeatedly switch the operating mode of the portable electronic device 10 to testing whether the power received by the USB charging port 11 is sufficient. For instance, when the control unit 135 has consecutively switched the portable electronic device 10 from the first power-saving mode to the normal mode for three times and the supply voltage Vin constantly falls below the threshold (e.g., 4.5V), the control unit 135 can thus verify that the standard of the USB power supplying port being connected to the USB charging port 11 is classified as 1500 mA. When the control unit 135 switches the operating mode of the portable electronic device 10 to the first power-saving mode for three times, and the supply voltage Vin constantly falls below the threshold (e.g., 4.5V), the control unit 135 can thus verify that the standard of the USB power supplying port being connected to the USB charging port 11 is classified as 1000 mA. Accordingly, the control unit 135 can utilize the above method to determine the standard (1000 mA, 1500 mA, and 2000 mA) of the DCP port.

Similarly, if the portable electronic device 10 was already operated under the first power-saving mode and the supply voltage Vin continues to drop, the control unit 135 switches the portable electronic device 10 to the second power-saving mode. The control unit 135 can thereby determine that the maximum supply current supplied by the USB power supplying port is 1000 mA and the supply power thereof is 5 W. The control unit 135 correspondingly configures the power consumption of the system load 15 to have the portable electronic device 10 normally booted under the second power-saving mode. Alternatively, when the voltage detection unit 133 detects that the supply voltage Vin being lower than the threshold (e.g., 4.5V), the control unit 135 can instantly configure the power consumption of the system load 15 to switch the portable electronic device 10 to one of the predetermined power-saving modes (e.g., the first power-saving mode and the second power-saving mode) until the supply voltage Vin rises above the threshold for a predetermined time. Thereafter, the control unit 135 stops switching among the power-saving modes and configures the portable electronic device 10 to operate in the currently selected one of the power-saving modes.

Figure 3:
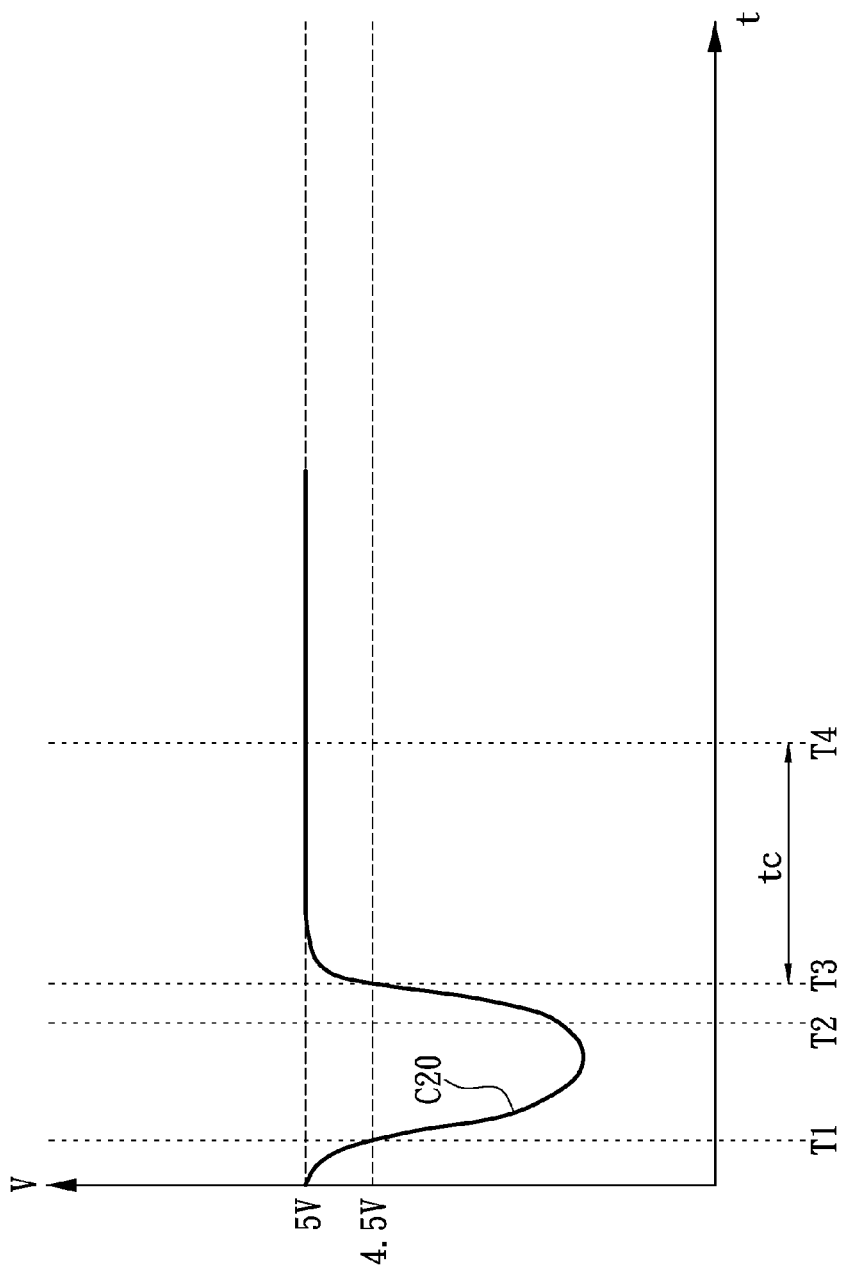
FIG. 3 is a waveform diagram illustrating another circuit operation of the portable electronic device provided in accordance to the first exemplary embodiment of the present disclosure.

Please refer to FIG. 3, which shows a waveform diagram illustrating another circuit operation of the portable electronic device provided in accordance to the first exemplary embodiment of the present disclosure. Curve C20 represents the supply voltage Vin received by the portable electronic device 10. As illustrated by curve C20, as the control unit 135 sequentially switches the portable electronic device 10 to one of the predetermined power-saving modes (i.e. from the normal operating mode to the first power-saving mode or from the first power-saving mode to the second power-saving mode), if the supply voltage Vin continually maintains above the threshold for a predetermined time tc, the control unit 135 stops switching among the power-saving modes to have the portable electronic device 10 operated under the currently selected one of the power-saving modes. The control unit 135 at same time operates to charge the rechargeable battery of the portable electronic device 10.

Additionally, when the USB detection unit 131 of the portable electronic device 10 determines that the type of the USB power supplying port is the SDP port and the voltage level of the rechargeable battery of the portable electronic device 10 is higher than the threshold, the system load 15 of the portable electronic device 10 operates under the power provided by the rechargeable battery. Accordingly, the portable electronic device 10 can boots and operates in the normal operating modes.

It is worth to note that the control unit 135 may be implemented by incorporating the determination algorithm of the type of the USB and the power consumption configuration algorithm of the system load 15 into the processing chip via firmware design. The processing chip may include but not limited to a central process unit (CPU), a microcontroller, or an embedded controller, however the instant embodiment is not limited to the example provided herein. In one implementation, the control unit 135 may utilize the general purpose inputs (GPIs) of the microcontroller or the embedded controller to receive the detection signals respectively outputted by the USB detection unit 131 and the voltage detection unit 133, and the general purpose outputs (GPOs) to configure the operating mode of the portable electronic device 10 and power consumption of the system load 15.

It shall be noted that FIG. 1 is merely served to provide an illustration of the portable electronic device 10, and the present disclosure is not limited thereto. Similarly, the present disclosure does not limit the type, actual structure, implementation method, and/or connection method associated with the USB charging port 11, the USB detection unit 131, the voltage detection unit 133, and the control unit 135. Moreover, FIG. 2 and FIG. 3 are merely used as to illustrate circuit operation of the power management circuit and the present disclosure is not limited thereto.

Second Exemplary Embodiment

Figure 4:
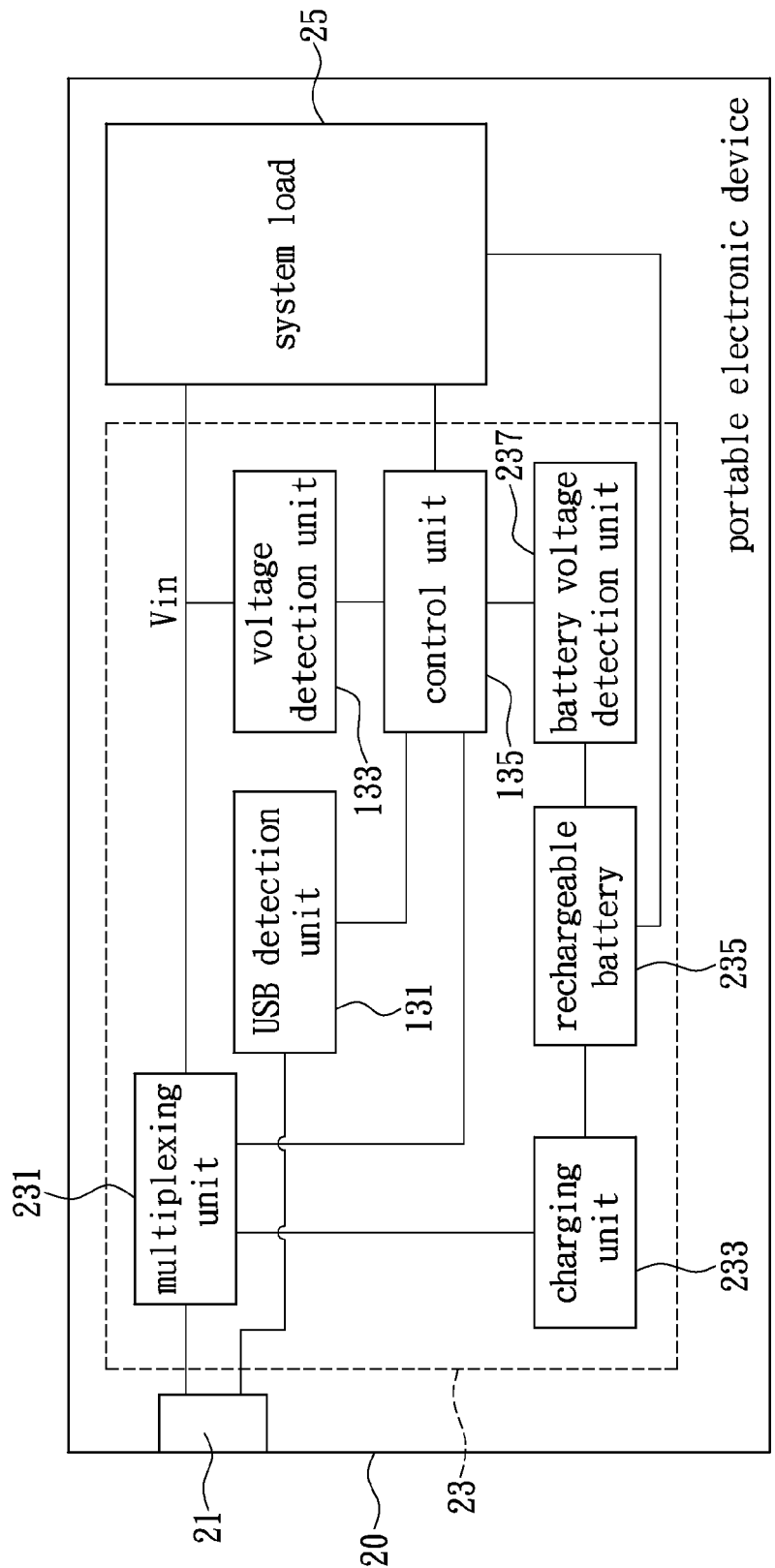
FIG. 4 is a schematic diagram illustrating a portable electronic device provided in accordance to a second exemplary embodiment of the present disclosure.

Please refer to FIG. 4, which shows a schematic diagram illustrating the portable electronic device provided in accordance to a second exemplary embodiment of the present disclosure. In the instant embodiment, the portable electronic device 20 may be a portable electronic device having a universal serial bus (USB) port including but not limited to a smart phone, a tablet, a personal digital assistance (PDA), a laptop, a digital camera, and an MP3 player.

The portable electronic device 20 includes a USB charging port 21, a power management 23, and a system load 25. The portable electronic device 20 can electrically connect to an external USB power supplying port (not shown) through the built-in USB charging port 21 to receive a supply voltage Vin. The power management circuit 23 can actively drive the operation of the system load 25 according to the type and supplied power associated with the USB power supplying port. The system load 25 in the instant embodiment may represent all the power consumed components (i.e., equivalent resistively loads) of the portable electronic device 20 including but not limited to a central processor (not shown), a system operation module (not shown), a display unit (not shown), and the peripheral devices.

The difference between the power management circuit 23 of FIG. 4 and the power management circuit 13 of FIG. 1 is in the circuit structure of the power management circuit 23. The power management circuit 23 further includes a multiplexing unit 231, a charging unit 233, a rechargeable battery 235, and battery voltage detection unit 237. The multiplexing unit 231 is respectively coupled to the USB charging port 21, the charging unit 233, the voltage detection unit 133, the control unit 135, and the system load 23. The charging unit 233 is coupled to the rechargeable battery 235. The rechargeable battery is coupled to the battery voltage detection unit 237 and the system load 25. The battery voltage detection unit 237 is coupled control unit 135.

The multiplexing unit 231 may selectively provide the supply voltage Vin to the charging unit 233, the voltage detection unit 133, and the system load 25. The charging unit 233 may use the supply voltage Vin received by the USB charging port 21 to charge the rechargeable battery 235 based on the supply power of the USB power supplying port and the temperature of the rechargeable battery 235. The rechargeable battery 235 is used for providing the power necessary to drive the system load 25 of the portable electronic device 20. The battery voltage detection unit 237 is used for detecting the power of the rechargeable battery 235.

Incidentally, the rechargeable battery 235 may be a single rechargeable battery, for example, a Lithium-Ion battery, a Ni—Cd battery, or a Ni-MH battery. The rechargeable battery 10 can further be a rechargeable battery pack or any other type of battery designed specifically for the portable electronic device 20 and the present disclosure is not limited thereto.

Simply speaking, the control unit 135 may detect the voltage level of the rechargeable battery 235 using the battery voltage detection unit 237 so as to configure the power consumption of the system load 25 according to the status of the rechargeable battery 235 and the supply voltage Vin received by the USB charging port 21. The portable electronic device 20 thus can initiate the booting process and operate under the selected operating mode. At the same time, the control unit 135 may further drive the multiplexing unit 231 to provide the supply voltage Vin of the USB charging port 21 to the charging unit 233 so as to charge the rechargeable battery 235.

Specifically, when the control unit 135 detects that the voltage level of the rechargeable battery 235 is higher than a predetermined value (e.g., 10% of the operating voltage of the rechargeable battery 235) through the battery voltage detection unit 237, the portable electronic device 20 may boot under the normal operating mode using the power provided by the rechargeable battery 235.

If the control unit 135 detects that the voltage level of the rechargeable battery 235 is lower than the predetermined value using the battery voltage detection unit 237 while determines that the type of the USB power supplying port is SDP port, the control unit 135 stops the portable electronic device 20 from turning on. The control unit 135 at same time may drive the multiplexing unit 231 to provide the supply voltage Vin received by the USB charging port 21 to charge the rechargeable battery 235. So that the portable electronic device 20 may instantly use the power of the rechargeable battery 235 to boot when the rechargeable battery 235 being charged to above the threshold.

Next, if the control unit 135 detects that the voltage level of the rechargeable battery 235 is lower than the predetermined value using the battery voltage detection unit 237 while determines that the type of the USB power supplying port is DCP port, the control unit 135 drives the multiplexing unit 231 providing the supply voltage Vin received by the USB charging port 21 to the system load 25. Additionally, the control unit 135 may determine the operating mode according to the supply power determination method describe in the aforementioned embodiment to have the portable electronic device 20 booted normally. The control unit 132 further may drive multiplexing unit 231 to provide the supply voltage Vin of the USB charging port 21 to the charging unit 233 to charge the rechargeable battery 235 when the USB charging port 21 supplies sufficient supply power to drive the system load 25.

It is worth to note that in one implementation, the control unit 135 may utilize the general purpose inputs (GPIs) of the microcontroller or the embedded controller to receive the detection signals respectively outputted by the USB detection unit 131, the voltage detection unit 133, and the battery voltage detection unit 237 as well as the general purpose outputs (GPOs) to configure the operating mode of the portable electronic device 20 and power consumption of the system load 25, accordingly.

The rest of circuit operation and structure of the power management circuit 23 is essentially the same as the power management circuit 13. Based on the above elaborations, those skilled in the art should be able to understand the operation of the power management circuit 23, and further descriptions are hereby omitted. It shall be noted that FIG. 4 is merely served to provide a schematic diagram of the portable electronic device 20, and the present disclosure is not limited thereto. Similarly, the present disclosure does not limit the type, actual structure, implementation method, and/or connection method associated with the USB charging port 21, the USB detection unit 131, the voltage detection unit 131, the control unit 135, the multiplexing unit 231, the charging unit 233, the rechargeable battery 235, and the battery voltage detection unit 237.

The Third Exemplary Embodiment

The power management circuit 33 may include a voltage conversion unit to accept various input voltage with various voltage level. Please refer FIG. 5, which shows a block diagram illustrating a portable electronic device provided in accordance to a third exemplary embodiment of the present disclosure. In the instant embodiment, the portable electronic device 30 may be a portable electronic device having a universal serial bus (USB) port including but not limited to a smart phone, a tablet, a personal digital assistance (PDA), a laptop, a digital camera, and an MP3 player.

The portable electronic device 30 includes a USB charging port 31, a power management 33, and a system load 35. The portable electronic device 30 can electrically connect to an external USB power supplying port (not shown) through the built-in USB charging port 31 to receive a supply voltage Vin. The power management circuit 33 can drive the operation of the system load 35 according to the type and supplied power associated with the USB power supplying port. The system load 35 in the instant embodiment, may represent all the power consumed components (i.e., equivalent resistively loads) of the portable electronic device 30 including but not limited to a central processor (not shown), a system operation module (not shown), a display unit (not shown), and the peripheral devices.

Figure 5:
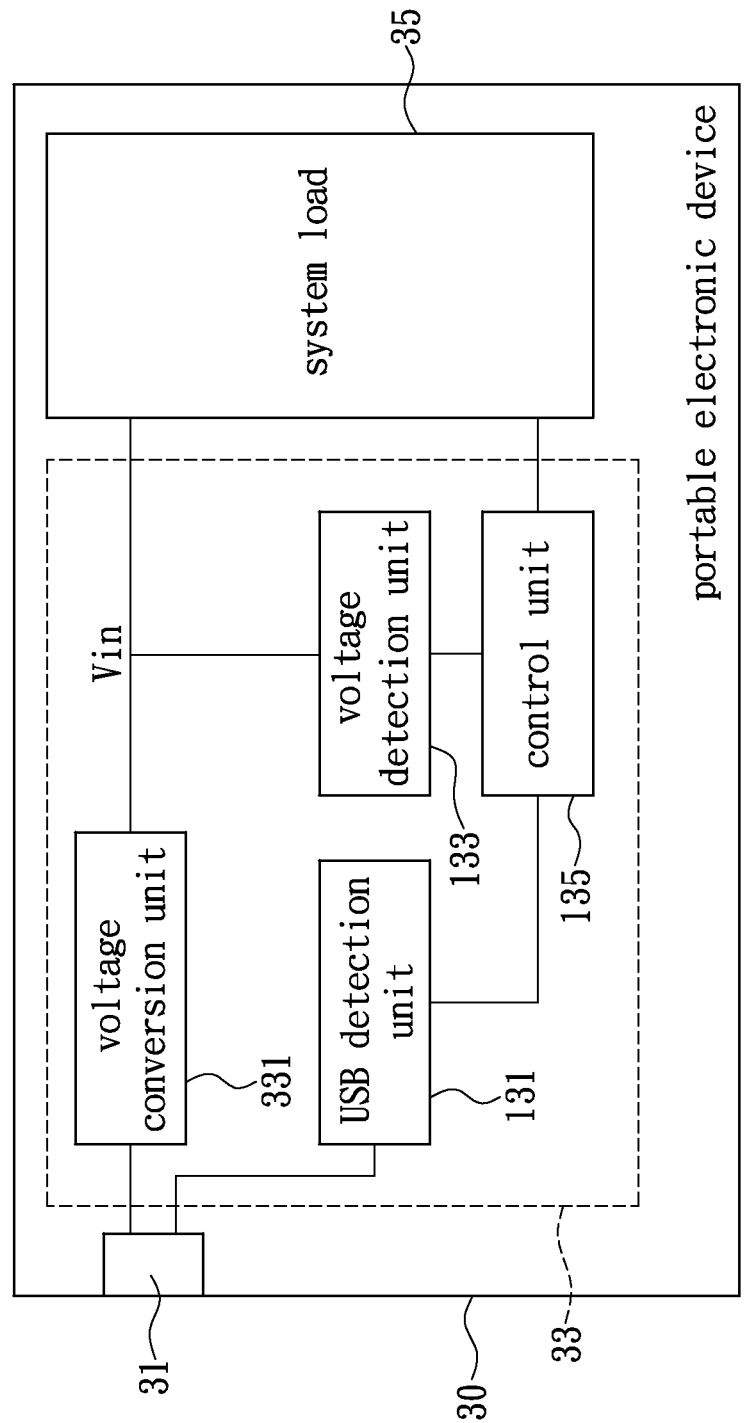
FIG. 5 is a block diagram illustrating a portable electronic device provided in accordance to a third exemplary embodiment of the present disclosure.

The difference between the power management circuit 33 of FIG. 5 and the power management circuit 13 of FIG. 1 is in the circuit structure of the power management circuit 33. The power management circuit 33 further includes a voltage conversion unit 331. The voltage conversion unit 331 is coupled between the USB charging port 31 and the system load 35. The voltage conversion unit 331 is also coupled between the voltage detection unit 133 and the system load 35. The voltage conversion unit 331 may convert the supply voltage Vin received by the USB charging port 31 to the operating voltage (e.g., 5V) required by the portable electronic device 30 so as to supply the system load 35. The voltage conversion unit 331 may be implemented by a DC to DC converter or low dropout regulator, however the instant embodiment is not limited thereto.

When the USB charging port 31 receives the supply voltage Vin from the USB power supplying port, the voltage conversion unit 331 can convert the supply voltage Vin to the operating voltage (e.g., 5V) of the portable electronic device 30 so as to have the system load 35 stably operated. In which the supply voltage Vin may be 5V or 12V according to type of the USB power supplying port. The voltage detection unit 133 may determine the standard of the USB power supplying port (i.e., electrical rating) according to the output voltage of the voltage conversion unit 331. Such that the control unit 135 can correspondingly configure the system power consumption of the portable electronic device 30 to have the portable electronic device 30 booted normally.

Incidentally, the multiplexing unit, the rechargeable battery, the charging unit, and the voltage detection unit described in previously described embodiment may be also integrated in the power management circuit 33. In other words, the output voltage of the voltage conversion unit 331 can be used to charge the rechargeable battery through configuring the switching operation of the multiplexing unit and the charging unit.

The rest of circuit operation and structure of the power management circuit 33 is essentially the same as the power management circuit 13. Based on the above elaborations, those skilled in the art should be able to understand the operation of the power management circuit 33, and further descriptions are hereby omitted. It shall be noted that FIG. 5 is merely served as an illustration for the portable electronic device 30, and the present disclosure is not limited thereto. Similarly, the present disclosure does not limit the type, actual structure, implementation method, and/or connection method associated with the USB charging port 31, the voltage conversion unit 331, the system load 35, the USB detection unit 131, the voltage detection unit 131, and the control unit 135.

Fourth Exemplary Embodiment

From the aforementioned exemplary embodiments, the present disclosure may generalize a power management method for a portable electronic device having a universal serial bus (USB) port. The portable electronic device can electrically connect to a USB power supplying port (not shown) through the built-in USB charging port to receive a supply voltage for drive the booting operation of the portable electronic device.

The portable electronic device may be a portable electronic device having a universal serial bus (USB) port including but not limited to a smart phone, a tablet, a personal digital assistance (PDA), a laptop, a digital camera, and an MP3 player. The power management method may be implemented through writing the corresponding firmware into a processing chip embedded in the portable electronic device, wherein the processing chip may be a microcontroller or an embedded controller, and the present disclosure is not limited thereto.

Figures 1, 6:
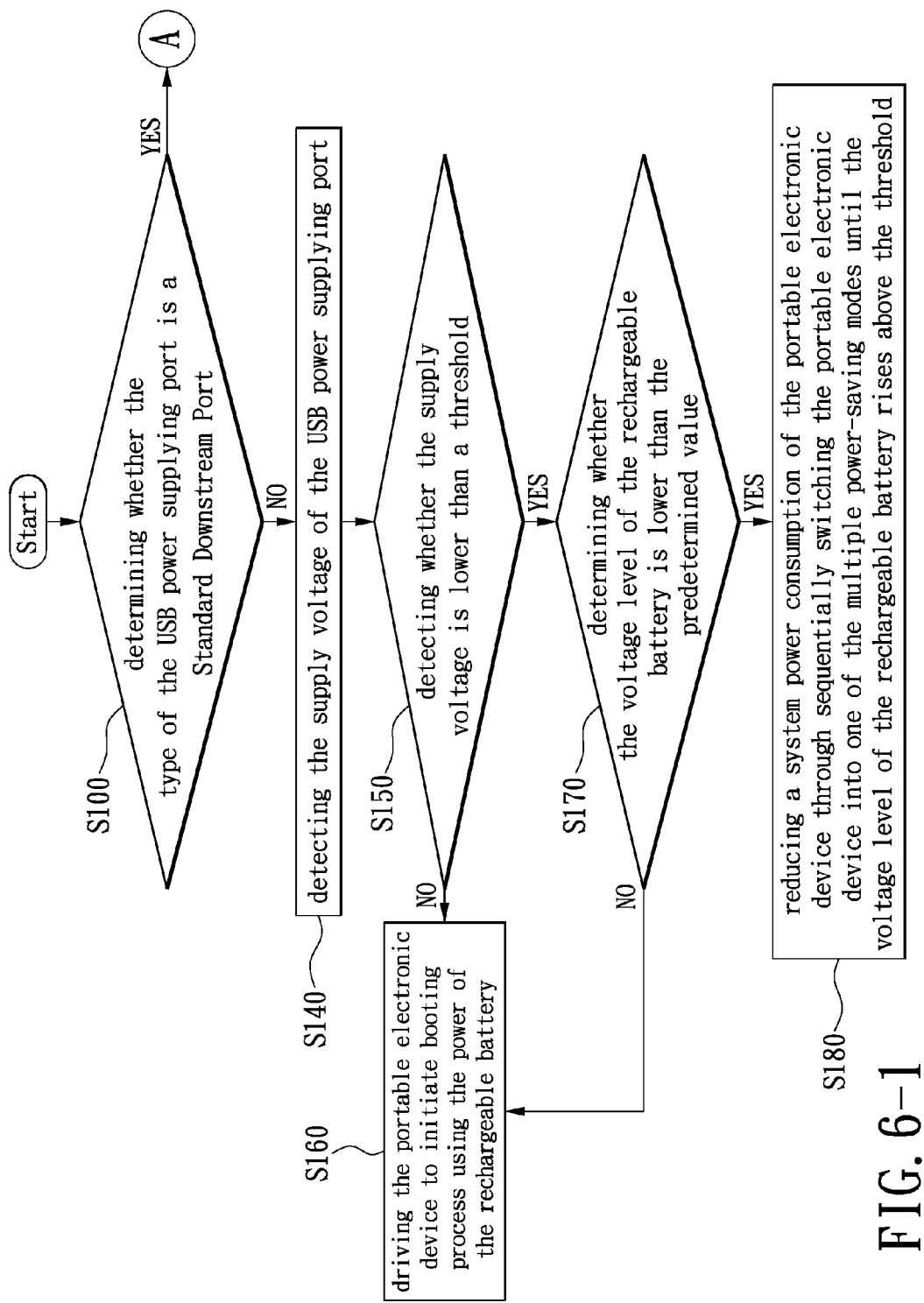
Figures 2, 6:
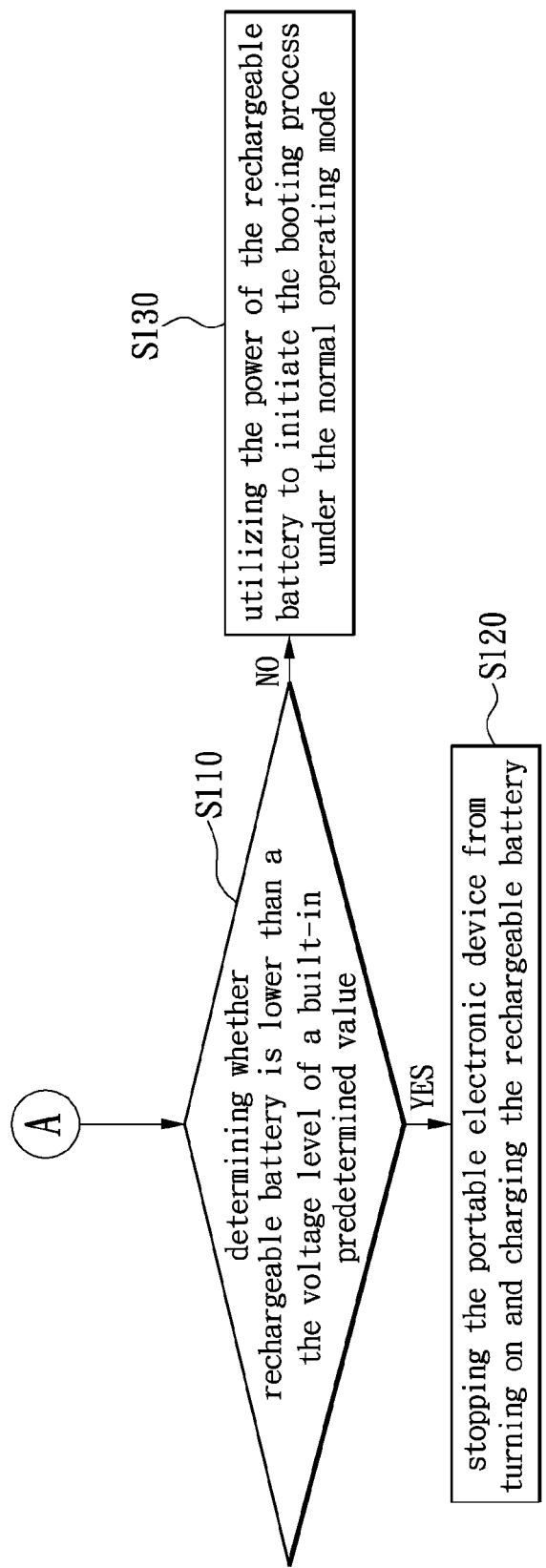

Please refer to FIG. 6-1 and FIG. 6-2 in conjunction with FIG. 1. FIG. 6-1 and FIG. 6-2 respectively illustrate a power management method provided in accordance to a fourth exemplary embodiment of the present disclosure.

In Step S100, the control unit 135 drives the USB detection unit 131 detecting the type of the USB power supplying port. To put it concretely, the control unit 135 drives the USB detection unit 131 determine whether the type of the USB power supplying port is a Standard Downstream Port (SDP). When the USB detection unit 131 determine that the type of the USB power supplying port is a SDP port, executes Step S110. Conversely, when the USB detection unit 131 determine that the type of the USB power supplying port is not a SDP port, i.e. the USB power supplying port is a Dedicated Charging Port (DCP), executes Step S140.

It is worth to note that the USB detection unit 131 may determine the type of the USB power supplying port according to the data line connection thereof. For instance, the USB detection unit 131 may output a voltage to data pin D+ and detect the voltage at the data pin D−. When the voltage at pin D+ and pin D− are approximately the same, indicating that the USB power supplying port is the DCP port. On the other hand if the voltage at pin D+ and pin D− forms an open circuit, indicating that the USB power supplying port is the SDP port.

In Step S110, determine whether the voltage level of a built-in rechargeable battery of the portable electronic device 10 is lower than a predetermined value. The predetermined value may be defined as the lower supply voltage limit of the rechargeable battery e.g., 10% of the rechargeable battery voltage. When the voltage level of the rechargeable battery of the portable electronic device 10 is lower than the predetermined value, executes Step S120, otherwise executes S130.

In Step S120, the control unit 135 terminates the operation of the system load 15 to stop the portable electronic device 10 from turning on. At the same time, the control unit 135 drives a charging unit (not shown in FIG. 1) to charge the rechargeable battery using the supply current provided by the SDO port. In Step S130, the portable electronic device 10 can use the power of the rechargeable battery to initiate the booting process under the normal operating mode.

In Step 140, when the type of the USB power supplying port is determined to be DCP port, the voltage detection unit 133 is drove to detect the supply voltage Vin received by the USB charging port 11. In Step S150, the voltage detection unit 133 detects whether the supply voltage Vin is lower than a threshold (e.g., 4.5V) to have the control unit 135 determining the supply power of the USB power supplying port. When the voltage detection unit 133 detects that the supply voltage Vin is higher than the threshold (e.g., 4.5V), executes Step S160. Otherwise, executes Step S170.

In Step S170, when the voltage detection unit 133 determines that the supply voltage Vin is lower than the threshold, indicating that the supply power is insufficient to drive the system load 15, determines whether the voltage level of the rechargeable battery is lower than the predetermined value. If the voltage level of the rechargeable battery is higher than the predetermined value, executes Step S160 to have the portable electronic device 10 initiating the booting process using the power of the rechargeable battery. Conversely, if the voltage level of the rechargeable battery is lower than the predetermined value, executes Step S180.

In Step S180, the control unit 135 reduces a system power consumption of the portable electronic device 10 by configuring the power consumption of the system load 15 (e.g., reduce the central processor operating frequency and the brightness level). The control unit 135 sequentially switches the portable electronic device 10 into one of the multiple power-saving modes until the voltage level of the rechargeable battery rises above the threshold. So that the portable electronic device 10 can stably initiate the booting process under the selected power-saving mode. At the same time, the control unit 135 drives the charging unit to charge the rechargeable battery using the power supplied by the power supplying port.

Figures 1, 7:
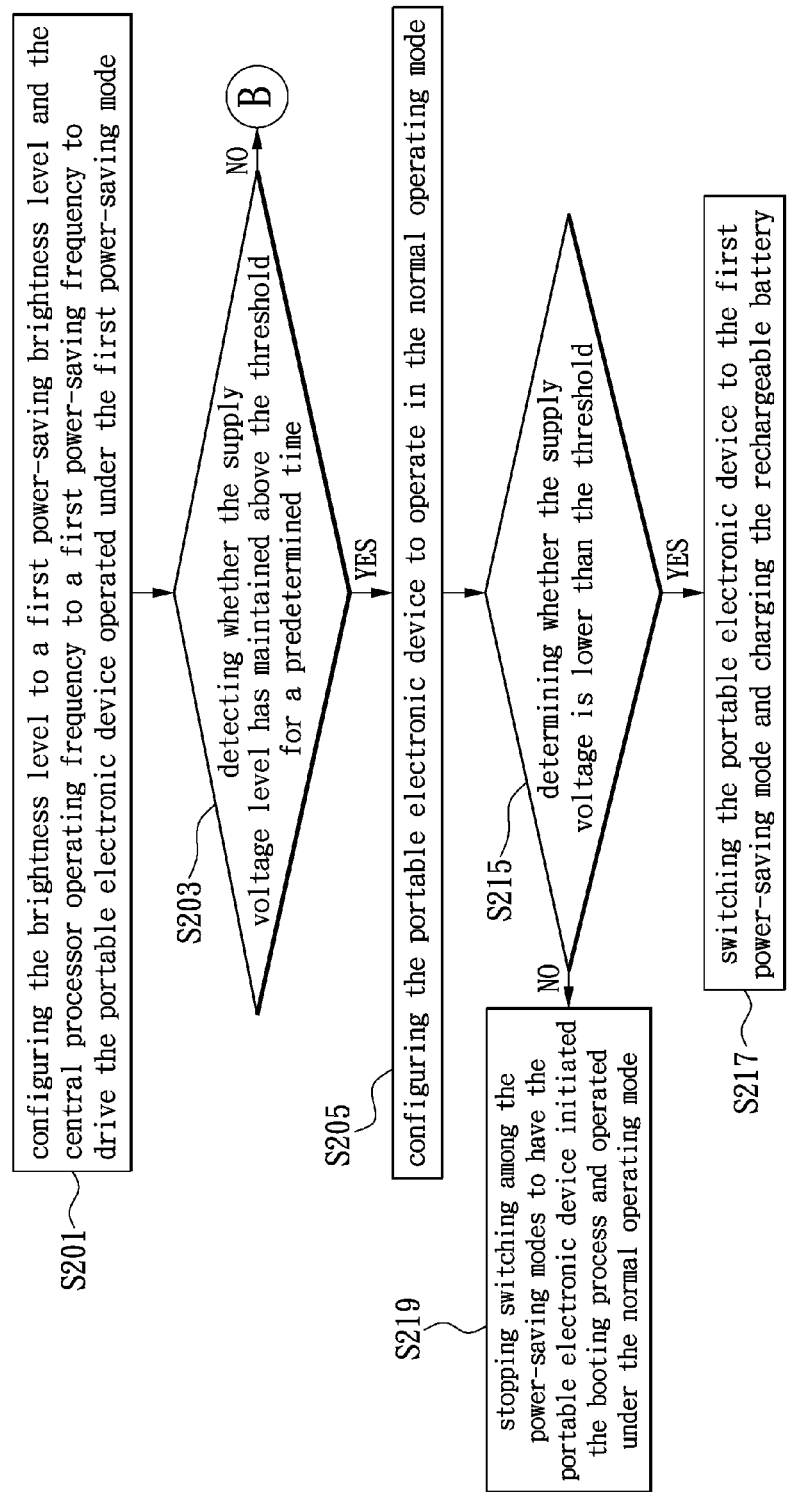
Figures 2, 7:
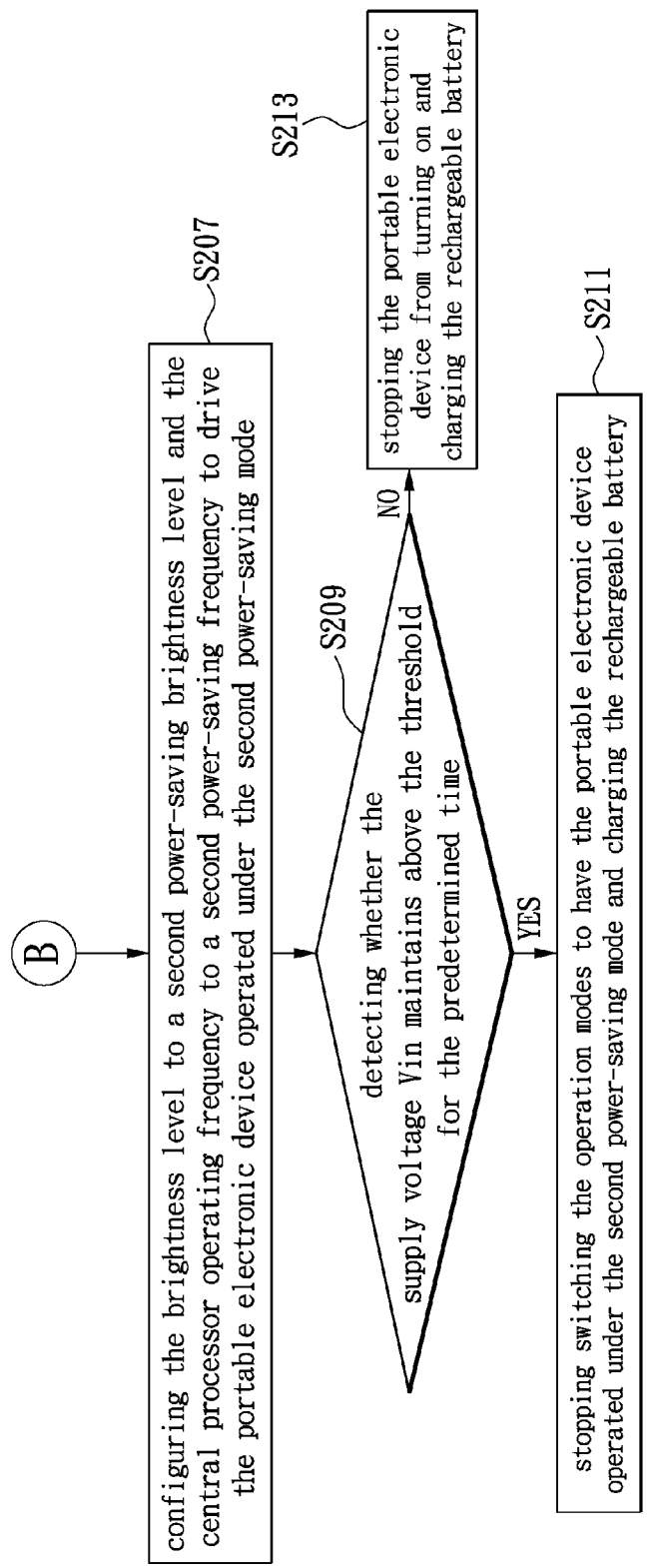

From the aforementioned exemplary embodiments, the instant embodiment further generalizes a method for determining the supply power of the USB power supplying port and the corresponding operation mode for portable electronic device. Please refer to FIG. 7-1 and FIG. 7-2 in conjunction with FIG. 1, in which FIG. 7-1 and FIG. 7-2 respectively illustrate a method of supply power determination and operating mode switching operation provided in accordance to the fourth exemplary embodiment of the present disclosure.

When the control unit 135 determines that the supply voltage Vin received by the USB charging port 11 from the USB power supplying port is lower than the threshold, the control unit 135 correspondingly configures the system power consumption of the portable electronic device 10. The control unit 135 actively drives the portable electronic device 10 sequentially switching among multiple power-saving modes to have the supply voltage Vin maintained above the threshold. The portable electronic device 10 can thereby stably initiate the booting process using the supply power of the USB power supplying port. The power-saving modes may correspond to the supply current (i.e. supply power) of the USB power supplying port. The control unit 135 can drive the portable electronic device 10 switching among a normal operating mode, a first power-saving mode, and a second power-saving mode.

It is worth to note that in the instant embodiment, the normal operating mode may correspond a DCP port providing supply power of 10 W i.e., supplying 5V with maximum supply current of 2000 mA. The first power-saving mode may correspond to a DCP port proving supply power of 7.5 W i.e., supplying 5V with maximum supply current of 1500 mA. The second power-saving mode may correspond to a DCP port providing supply power of 5 W i.e., supplying 5V with maximum supply current of 1000 mA. In practice, the above correspondences between the power-saving modes e.g., the normal operating mode, the first power-saving mode, and the second power-saving mode to the supply power is configured in accordance to the standard of the USB power supplying port defined in the USB-IF BC1.1 and the present disclosure is not limited thereto.

Specifically, in Step S201, the control unit 135 can respectively configure the brightness level to a first power-saving brightness level and the central processor operating frequency to a first power-saving frequency to drive the portable electronic device 10 operated under the first power-saving mode. The first power-saving brightness level may be 80% brightness of the normal brightness level. The first power-saving brightness level may be configured through outputting a pulse width modulation signal to adjust the illumination level of the display unit (not shown) of the system load 15. The first power-saving frequency may be 70% of the normal operating frequency. The first power-saving frequency can be configured through adjusting the period of the clock signal associated with the central processor. Accordingly, the system power consumption of the portable electronic device 10 can be reduced.

In Step S203, the control unit 135 drive the voltage detection unit 133 detecting whether the supply voltage level has maintained above the threshold for a predetermined time (e.g., 20 ms~60 ms) to determine the supply power of the power supplying port and the operating mode of the portable electronic device 10. When detects that the supply voltage level is lower than the threshold, execute Step S207, otherwise executes Step S205.

In Step S207, when the portable electronic device 10 operates in the first power-saving mode with the supply voltage Vin continually being lower than the threshold (e.g., 4.5V), the control unit 135 determines that the current supply power is insufficient to support the operation of the system load 15. The control unit 135 instantly reduces the brightness level to a second power-saving brightness level (e.g., 60% of the normal brightness level) and the central processor operating frequency to a second power-saving frequency (e.g., 70% of the normal operating frequency) to drive the portable electronic device operated under the second power-saving mode. The control unit 135 at same time determines that the supply power of the USB power supplying port is 5 W, i.e., the supply voltage Vin is 5V with the maximum supply current of 1000 mA.

In Step S209, the control unit 135 further drives the voltage detection unit to detect whether the supply voltage Vin maintains above the threshold for the predetermined time under the second power-saving mode. When the control unit 135 determines that the supply voltage Vin continues drop below the threshold in the second power-saving mode, executes Step S213. When the control unit 135 determines that the supply voltage Vin maintains above the threshold for the predetermined time in the second power-saving mode, executes Step S211.

In Step S211, the control unit 135 stops switching among the power-saving modes to have the portable electronic device operated in the second power-saving mode. The control unit 135 at same time constantly charges the rechargeable battery to have the rechargeable battery replacing the USB power supplying port and supply power to the system load 15 when the rechargeable battery is fully charged. In Step S213, the control unit 135 stops the portable electronic device 10 from turning on and charges the rechargeable battery.

In Step S205, the control unit 135 may actively configure the portable electronic device 10 to operate in the normal operating mode. The control unit 135 configures the brightness level to the regular brightness level and the central processor operating frequency to the regular operating frequency to have the portable electronic device in the normal operating mode. Therefore the possibility of misjudging system power consumption due to the initial surge current being generated at start-up can be avoided.

After the switches back to the normal operating mode, in Step S215, the control unit 135 drives the voltage detection unit 133 detecting the supply voltage Vin to determine whether the supply voltage is lower than the threshold. When the supply voltage is lower than the threshold, executes Step S217, otherwise executes Step S219.

In Step S217, the control unit 135 switches the portable electronic device 10 again to the first power-saving mode and determine that the supply power of the USB power supply current is 7.5 W, i.e., the supply voltage Vin is 5V with the maximum supply current of 1500 mA. Meanwhile, the control unit 135 uses the supply power of the USB power supplying port to charge the rechargeable battery through the charging unit.

In Step S219, when the supply voltage Vin is higher than the threshold for a predetermined time, the control unit 135 stops switching among the power-saving modes to have the portable electronic device 10 initiated the booting process and operated under the normal operating mode.

Incidentally, in one implementation, after switched the portable electronic device 10 from the normal operating mode to the first power-saving mode, the control unit 135 can repeatedly executes steps of detecting the supply voltage and switching between the normal operating mode and the first power-saving mode (i.e., Step S205, S215 and S217) for at least twice to verify the supply power of the USB power supplying port. Similarly, after switched the portable electronic device 10 from the first power-saving mode to the second power-saving mode, the control unit 135 can repeatedly executes steps of detecting the supply voltage and switching between the first power-saving mode and the second power-saving mode. That is to say that the control unit 135 may through repeatedly switching the operating modes of the portable electronic device 10 verifying which operating modes can the power received at the USB charging port 11 support. Or to determine the standard of the USB power supplying port, i.e. being the 1000 mA DCP port, 1500 mA DCP port or 2000 mA DCP port. However, in practice, the number of times of detecting supply voltage Vin and switching among operating modes may be decided base on the operation requirement of the portable electronic device 10 hence the present disclosure is not limited herein.

It is worth to mention that as previously described the power management method respectively illustrated in FIG. 6-1, FIG. 6-2, FIG. 7-1, and FIG. 7-2 may be implemented through writing the corresponding firmware into a microcontroller or an embedded controller embedded in the portable electronic device 10 and performed during the booting process, and the present disclosure is not limited thereto.

FIG. 6-1, FIG. 6-2, FIG. 7-1, and FIG. 7-2 are merely served to describe the power monument method and the supply power determination method generalized for the portable electronic device 10 and shall not be used to limit the present disclosure.

Additionally, the coupling connections among the aforementioned components includes both direct or indirect electrical connections and the scope of the present invention does not limit the type of connection employed as long as the choice type of connection selected is able to fulfill the electrical signal transmission functionality. The techniques described in the aforementioned embodiments may be combined or used independently. Furthermore, the associated components may be added, deleted, modified or replaced base on the needs of specific design and functional requirements and the present disclosure should not be limited thereto. From the explanation of the aforementioned embodiment, those skilled in the art should be able to deduce the other embodiments according to the disclosure of the present invention, and further descriptions are therefore omitted.

In summary, an exemplary embodiment of the present disclosure provides a power management circuit and method thereof. The power management circuit and method thereof can actively determine whether the portable electronic device can initiate the booting process and configure the initial system power consumption through detecting the type of the USB power supplying port and the supply power thereof at system prior to the initiation of the booting process. Consequently, the issues of instantly turning on and off causing instantly of the portable electronic device due to the connected USB power supplying port not being able to support the system power consumption required or power provided by the built-in rechargeable battery being insufficient can be effectively avoided. The system stability can therefore be increased.

Moreover, the power management circuit and method thereof can further uses the power supplied by the USB power supplying port to charge rechargeable battery when the power provided by the rechargeable battery become insufficient thereby shorten the charging period of the rechargeable battery. Accordingly, through utilizes the power management circuit and method thereof provided by the present disclosure, the portable electronic device can use the USB port for charging without the need to equip with specific charging port, adapter and the corresponding charger. The manufacturing cost of the portable electronic device can be reduced while convenience and stability of the portable electronic device can be thereby increased.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A power management circuit, adapted for a portable electronic device having a universal series bus (USB) charging port, the portable electronic device electrically connected to a USB power supplying port through the USB charging port to receive a supply voltage, the power management circuit comprising:
    a USB detection unit, coupled to the USB charging port, determining the type of the USB power supplying port connected to the USB charging port being a Standard Downstream Port (SDP) or a Dedicated Charging Port (DCP);
    a voltage detection unit, coupled to the USB charging port, detecting the supply voltage; and
    a control unit, coupled to the USB detection unit and the voltage detection unit, configuring a system power consumption of the portable electronic device based on the type of the USB power supplying port and the supply voltage;
    wherein when the portable electronic device initiates a booting process with the USB power supplying port being the DCP and the supply voltage being lower than a threshold, the control unit reduces the system power consumption of the portable electronic device maintaining the supply voltage above the threshold for the portable electronic device to initiate the booting process normally;
    wherein the control unit configures a central processor operating frequency and a brightness level of the portable electronic device to generate multiple power-saving modes; wherein the power-saving modes includes a first power-saving mode and a second power-saving mode, the system power consumption of the portable electronic device in the second power-saving mode being lower than the system power consumption of the portable electronic device in the first power-saving mode, the control unit configuring the central processor operating frequency and the brightness level to respectively generate the first power-saving mode and the second power-saving mode according to the supply power of the USB power supplying port.

2. The power management circuit according to claim 1, wherein the control unit drives a charging unit to start charging a rechargeable battery of the portable electronic device when the portable electronic device operates in the currently selected one of the power-saving modes.

3. The power management circuit according to claim 1, wherein the voltage detection unit comprises a comparator having a first input terminal, a second input terminal, and an output terminal, the first input terminal coupled to the USB charging port, the second input terminal coupled to a reference voltage in corresponding to the threshold, and the output terminal coupled to the control unit.

4. A power management circuit, adapted for a portable electronic device having a universal series bus (USB) charging port, the portable electronic device electrically connected to a USB power supplying port through the USB charging port to receive a supply voltage, the power management circuit comprising:
    a USB detection unit, coupled to the USB charging port, determining the type of the USB power supplying port connected to the USB charging port being a Standard Downstream Port (SDP) or a Dedicated Charging Port (DCP);
    a voltage detection unit, coupled to the USB charging port, detecting the supply voltage; and
    a control unit, coupled to the USB detection unit and the voltage detection unit, configuring a system power consumption of the portable electronic device based on the type of the USB power supplying port and the supply voltage;
    wherein when the portable electronic device initiates a booting process with the USB power supplying port being the DCP and the supply voltage being lower than a threshold, the control unit reduces the system power consumption of the portable electronic device maintaining the supply voltage above the threshold for the portable electronic device to initiate the booting process normally;
    wherein the control unit configures a central processor operating frequency and a brightness level of the portable electronic device to generate multiple power-saving modes;
    wherein the control unit determines a supply power of the USB powering supplying port according to the change in the supply voltage;
    wherein if the USB power supplying port being the SDP port and the voltage level of a rechargeable battery being lower than a predetermined value, the control unit stops the portable electronic device from turning on.

5. The power management circuit according to claim 4, wherein if the USB power supplying port being the DCP port and the voltage level of the rechargeable battery being higher than the predetermined value, the control unit drives the portable electronic device to initiate the booting process using the supply power.

* * * * *